(12) United States Patent  (10) Patent No.: US 7,584,924 B2
Ow  (45) Date of Patent: Sep. 8, 2009

(54) HIGH SPEED VERTICAL TAKE-OFF AND LAND AIRCRAFT WITH ACTIVE FAN BALANCING SYSTEM

(75) Inventor: Gordon Y. W. Ow, Long Beach, CA (US)

(73) Assignee: Go Aircraft Ltd., Long Beach, CA (US)

( * ) Notice: Subject to any disclaimer, the term of this patent is extended or adjusted under 35 U.S.C. 154(b) by 449 days.

(21) Appl. No.: 11/700,485

(22) Filed: Jan. 31, 2007

(65) Prior Publication Data
US 2009/0121087 A1 May 14, 2009

Related U.S. Application Data

(63) Continuation-in-part of application No. 11/401,666, filed on Apr. 11, 2006.

(51) Int. Cl.
F01D 11/02 (2006.01)
B64C 27/22 (2006.01)

(52) U.S. Cl. .................... 244/12.4; 244/12.3; 244/12.5; 244/23 A; 244/23 B; 244/23 C; 277/307; 277/309; 277/355; 415/173.3; 415/174.2

(58) Field of Classification Search ................. 277/306, 277/307, 309, 318, 355; 244/12.1, 12.2, 244/12.4, 12.5, 12.3, 23 A, 23 B, 23 C, 23 D, 244/23 R; 415/110, 115, 173.3, 174.2
See application file for complete search history.

(56) References Cited

U.S. PATENT DOCUMENTS

| | | | |
|---|---|---|---|
| 2,667,226 A | 1/1954 | Doblhoff | |
| 2,863,261 A | 12/1958 | Davis | |
| 2,988,152 A | 6/1961 | Katzenberger at al. | |
| 3,182,929 A | 5/1965 | Lemberger | |
| 3,327,969 A | 6/1967 | Head | |
| 3,514,053 A | 5/1970 | McGuinness | |
| 4,452,410 A | 6/1984 | Everett | |
| 4,773,618 A | 9/1988 | Ow | |
| 5,039,031 A | 8/1991 | Valverde | |
| 5,076,590 A * | 12/1991 | Steinetz et al. | 277/355 |
| 5,094,290 A * | 3/1992 | Buckreus | 165/83 |
| 5,507,453 A | 4/1996 | Shapery | |
| 5,738,302 A | 4/1998 | Freeland | |
| 6,224,599 B1 * | 5/2001 | Baynham et al. | 606/90 |
| 6,382,560 B1 | 5/2002 | Ow | |
| 6,451,095 B1 * | 9/2002 | Keefer et al. | 96/125 |
| 2007/0059158 A1 * | 3/2007 | Alvanos et al. | 415/115 |

* cited by examiner

*Primary Examiner*—J. Woodrow Eldred
(74) *Attorney, Agent, or Firm*—King & Schickli, PLLC

(57) ABSTRACT

A high-speed vertical take-off and land aircraft includes a body with an engine supported by the body. A fan assembly is also carried by the body. The fan assembly includes a hub and a plurality of blades to provide vertical lift for the aircraft. A nozzle ring is provided on the fan assembly. The nozzle ring includes an annular nozzle array. Hot gases from the engine are fed to the nozzle array by a feed duct. A bearing mechanism supports the fan assembly on the body. The bearing mechanism is carried in a work space. A brush seal assembly thermally isolates the work space from the hot exhaust gases passing through the feed duct to the nozzle array.

12 Claims, 6 Drawing Sheets

HIGH SPEED VERTICAL TAKE-OFF AND LAND AIRCRAFT WITH ACTIVE FAN BALANCING SYSTEM

This application is a continuation-in-part of U.S. application Ser. No. 11/401,666, filed 11 Apr. 2006.

TECHNICAL FIELD

The present invention relates generally to aircraft and, more particularly, to an aircraft with improved features for enhanced vertical take-off and landing (VTOL) capabilities and high speed (HS) horizontal flight.

BACKGROUND OF THE INVENTION

U.S. Pat. No. 6,382,560 to Ow discloses a high speed vertical take-off and land (HSVTOL) aircraft. The aircraft includes a disk-shaped fuselage with a rotatable fan assembly having a nozzle ring driven by hot jet gases and/or cool fan air from jet engines. High efficiency air bearings serve to support the rotatable fan assembly on the fuselage in the vertical direction and rollers around the perimeter provide horizontal support and stability. The present invention relates to an improvement of this basic design by incorporating an active system for sensing vibration and balancing the fan assembly as it is rotated.

SUMMARY OF THE INVENTION

In accordance with the purposes of the present invention, an improved HSVTOL aircraft is provided. The aircraft includes a body or fuselage. An engine is supported on that body. In addition, the body carries a fan assembly. The fan assembly includes a hub and a plurality of blades to provide vertical lift off for the aircraft.

A nozzle ring on the fan assembly provides an annular nozzle array for ejecting hot exhaust gases from the engine. A feed duct receives the hot exhaust gases from the engine and directs those gases to the annular nozzle array. An interface is formed between the feed duct and the annular nozzle array. The hot exhaust gases pass through this interface and have a pressure $P_1$. In addition, a bearing mechanism vertically supports and horizontally centers the fan assembly on the body. The bearing mechanism is carried in a work space defined between the body and the fan assembly. Still further, a brush seal assembly thermally isolates the work space from the hot exhaust gases moving through the feed duct and the annular nozzle array.

More specifically, the brush seal assembly includes (a) a brush seal positioned across an entry to the work space, (b) a brush seal manifold provided between the brush seal and the interface and (c) an air source. The air source provides pressurized air to the brush seal manifold. The pressurized air is provided at a pressure $P_2$ that is equal to or greater than the pressure $P_1$ of the hot exhaust gases at the interface. The pressurized air in the manifold essentially provides a curtain of relatively cool air between the brush seal and the hot exhaust gases whereby the work space is thermally isolated from the hot exhaust gases.

Further describing the invention, the brush seal manifold is open to the interface between the annular nozzle array and the feed duct. In addition, the brush seal assembly includes a pressure sensor that senses the pressure of the exhaust gases in one of the annular nozzle array, feed duct or interface.

Still further, the brush seal assembly includes a controller responsive to the pressure sensor. The controller is connected to the air source. The controller adjusts the pressure of the pressurized air in the brush seal manifold in order to maintain the air curtain and a desired temperature in the work space. The brush seal and the brush seal manifold may both be annular in shape and extend around the body.

In accordance with an additional aspect of the present invention a brush seal assembly is provided for thermally isolating a first space from hot gases in a second space having a pressure $P_1$. The assembly comprises a brush seal positioned across an entry to the first space, a brush seal manifold provided between the brush seal and the second space and an air source providing pressurized air to the brush seal manifold at a pressure $P_2$ where $P_2$ is equal to or greater than $P_1$. The pressurized air effectively forms a curtain of relatively cool air between the brush seal and the hot gases whereby the first space is thermally isolated from the hot gases.

Further describing this invention, the brush seal manifold is open to the second space. In addition, the brush seal assembly includes a pressure sensor that senses the pressure of the hot gases in the second space. Further, the brush seal assembly includes a controller responsive to the pressure sensor. The controller is connected to the air source and adjusts the pressure $P_2$ of the pressurized air in the brush seal manifold in order to maintain an effective air curtain and the desired temperature in the first space.

In accordance with yet another aspect of the present invention a method is provided for thermally isolating a first space from hot gases in a second space. The method comprises the steps of providing a brush seal between the first space and the second space, providing a brush seal manifold between the brush seal and the second space and delivering pressurized air to the brush seal manifold at a pressure necessary to form an air curtain between the first space and the second space. The method further includes the step of sensing pressure in the second space and adjusting the pressure of the pressurized air in the brush seal manifold in order to maintain the air curtain and a desired operating temperature in the first space. Still further, the method may include the step of adjusting the temperature of the pressurized air delivered to the brush seal manifold by the air source.

In the following description there is shown and described a preferred embodiment of the invention, simply by way of illustration of one of the modes best suited to carry out the invention. As it will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain certain principles of the invention. In the drawings:

FIG. 2a is an enlarged, partially schematical view illustrating the mounting of an idler roller to the hub of the fan assembly;

Reference will now be made in detail to the present preferred embodiment of the invention, an example of which is illustrated in the accompanying drawings.

DETAILED DESCRIPTION OF THE INVENTION

Figure 1:
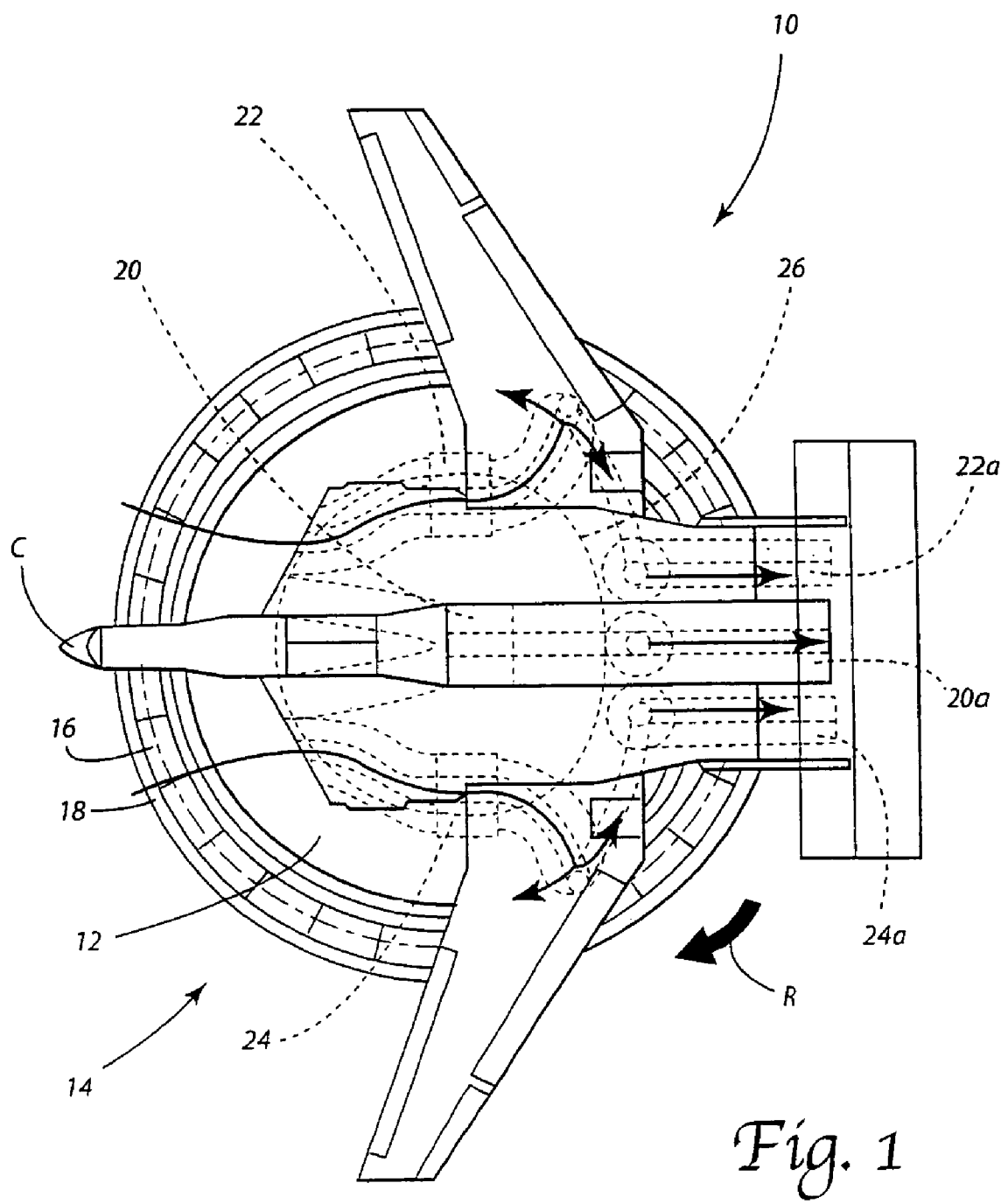
FIG. 1 is an overall top view of the HSVTOL aircraft of the present invention illustrating in dashed outline the schematic arrangement of the fan jet engines and composite feed ducts, plenum and other components.

Reference is now made to FIG. 1 illustrating the HSVTOL aircraft 10 of the present invention. The aircraft 10 is similar in design to that disclosed in my prior U.S. Pat. No. 6,382,560, the full disclosure of which is incorporated herein by reference. The center of the aircraft 10 is formed by a disk-shaped fuselage or body, generally designated by reference numeral 12. An outer fan assembly 14 surrounds the fuselage 12 and includes an inboard nozzle ring 16 with the perimeter being defined by a full periphery rim or shroud 18. The interface between the fuselage 12 and the nozzle ring 16 is provided with a rotary bearing and seal arrangement that allows the fan assembly 14 to freely rotate with respect to the fuselage 12. As described, the rotary motion is in the clockwise direction, and is generally represented by the action arrow R in FIG. 1. A pod mounted fan jet engine 20 extends along the horizontal axis of the aircraft 10 behind the pilot canopy C. Two additional fan jet engines 22 and 24 are viewed in dashed line form since in this preferred embodiment these two engines are submerged within the fuselage 12.

As made clear in my previous U.S. Pat. No. 6,382,560, pilotless operation is made possible by an onboard CPU controller that operates the engines 20, 22, 24 as well as all of the other flight components of the aircraft 10. In a piloted craft, a control stick or similar manual or automatic interface is employed by the pilot to fly the aircraft 10 through the controller. Flight attitude transducers can also be provided to provide input. Further, the onboard CPU controller, GPS and radio systems enable optimal unmanned autonomous operation.

Figure 2:
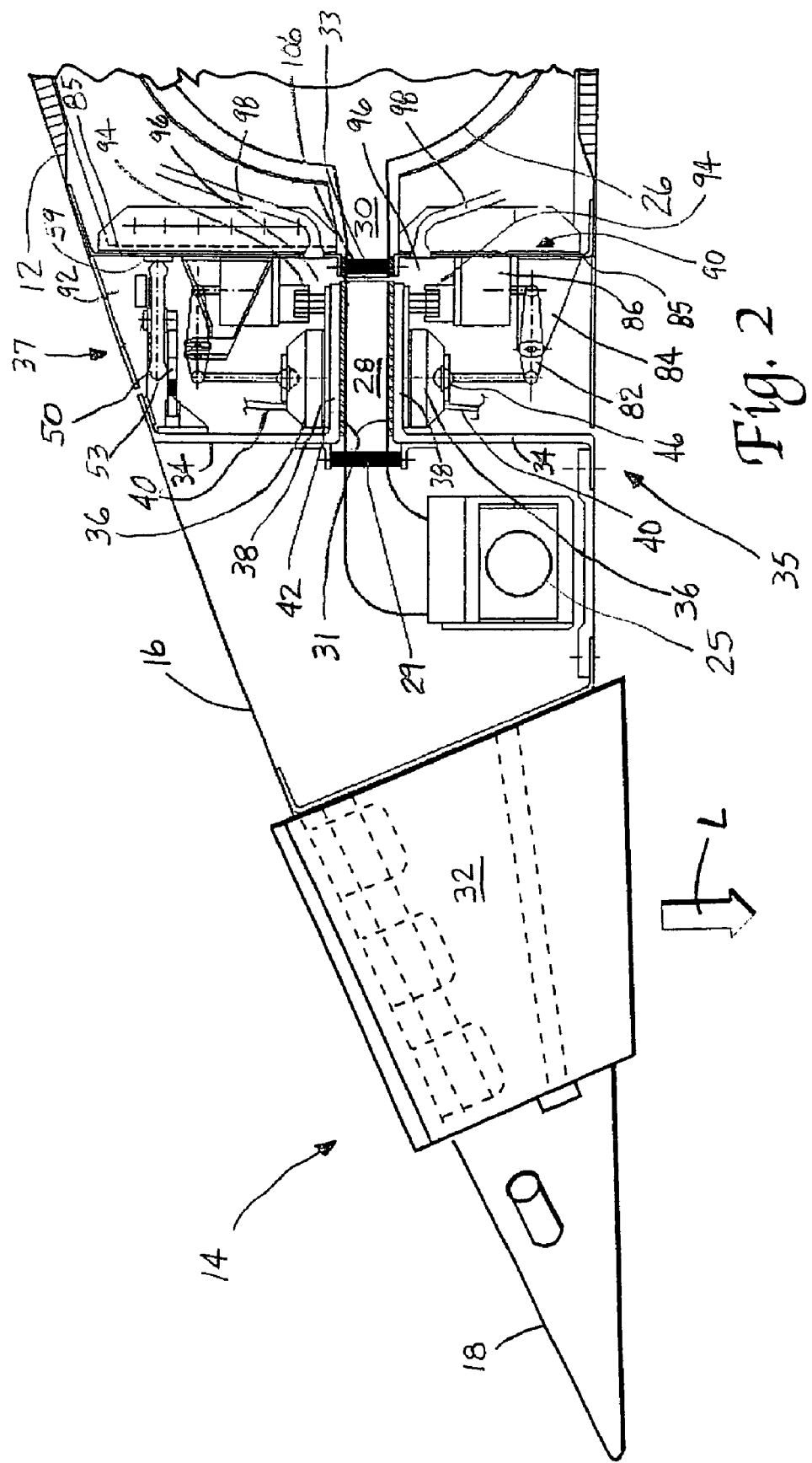
FIG. 2 is an enlarged cross sectional and partially schematical view in the transitional area between the fuselage and the fan assembly illustrating in detail the fan assembly and the annular interface hub of the fuselage.

The exhaust from the fan jet engines 20, 22, 24 is fed to an array of nozzles 25 that are arrayed around the full periphery of the nozzle ring 16 through an annular, feed duct 26 (see also FIG. 2). As the gases are discharged from the nozzles 25, the fan assembly 14 is rotated with respect to the fuselage 12 to provide vertical lift (see action arrow L). The fan assembly 14 provides a vertical fan thrust augmentation factor that multiplies the propulsion thrust that drives the fan by a factor of approximately 2.5. The fan thrust augmentation factor enables vertical takeoff of the HSVTOL with significant fuel and payload fractions which in turn enables extremely high VTOL performance.

More specifically describing the invention, the nozzle ring 16 is the component of the fan assembly 14 that is mated with the outer periphery of the fuselage 12. Each of the nozzles 25 are held in a separate segment of the nozzle ring 16. Between the nozzle ring 16 and the feed duct or plenum 26 is a transition zone through which the exhaust is transferred to the nozzle ring 16. A peripheral series of nozzle intake receptors 28 are formed on the inboard face of the nozzles 25. The receptors 28 extend through ceramic spacers 29 and are surrounded by a sleeve of thermal insulation 31. The feed duct 26 includes a plurality of matching feed orifices 30 positioned peripherally around the fuselage 12. The orifices 30 extend through the structural ring 85 of the body 12 and the ceramic spacers 33. Each of the interacting orifices 30 and the rapidly moving receptors 28 function to efficiently transfer the supply of jet separated exhaust core gases and fan air through an interface 106.

The exhaust from the nozzles 25 extends down at an approximately 15° angle and is ejected at high speed at this optimal angle through a restricted nozzle orifice. The nozzle ring 16 being inboard of the fan assembly 14 provides the appropriate spin action to the fan assembly without interference with the individual fan blades 32. After transitioning from vertical to horizontal flight, the exhaust from the fan jet engine 20 is gradually redirected through extension ducting and out of the tailpipe 20a. Similarly, the engines 22 and 24 have tailpipes 22a, 24a for horizontal cruise propulsion. The redirection of flow from these engines 22, 24 takes place directly through the section of the duct or plenum 26 extending along the aft quadrants of the aircraft.

Figure 3:
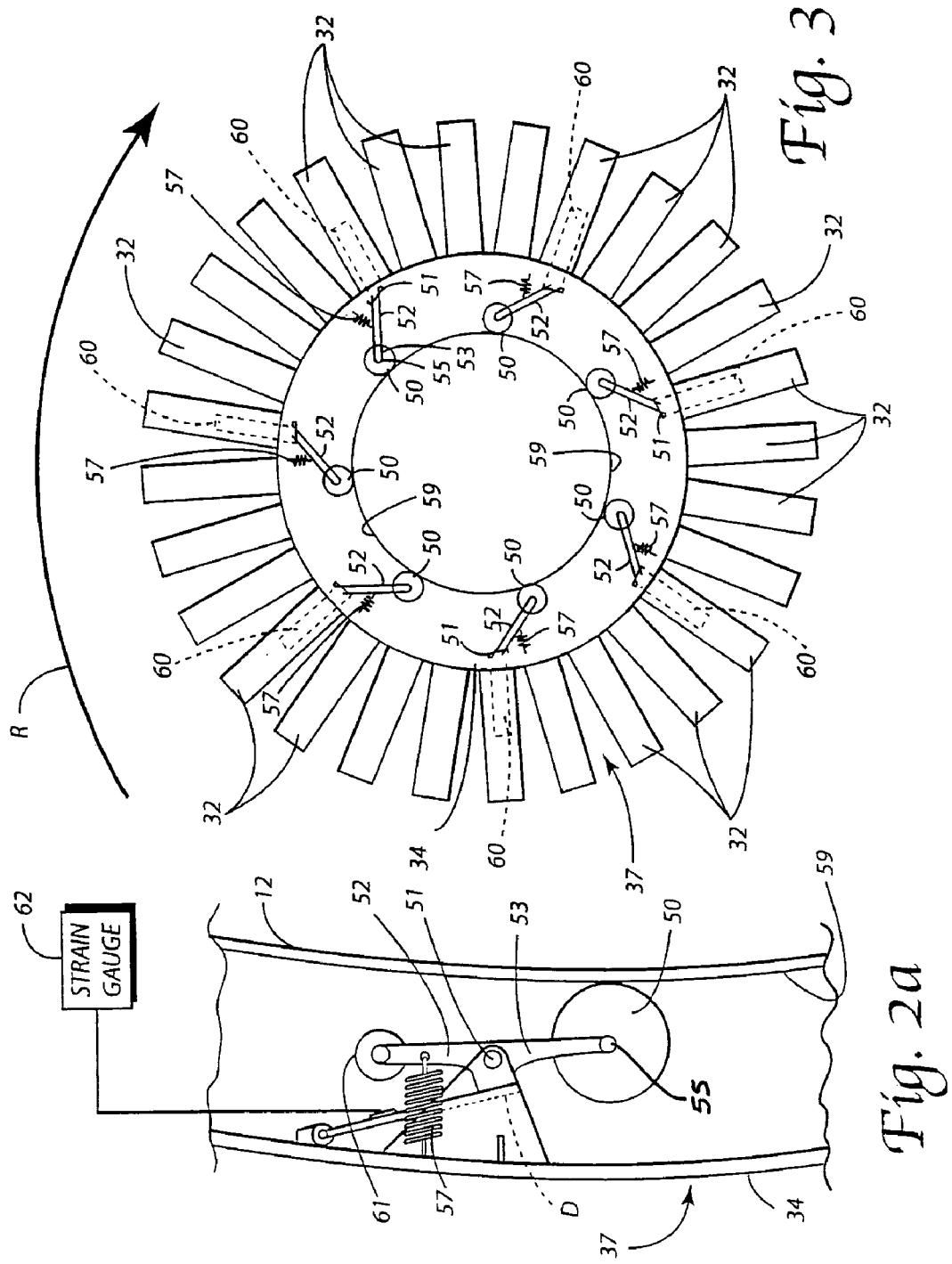
FIG. 3 is a schematical top plan view illustrating the active system for sensing vibration and balancing the fan assembly.

The fan assembly 14 comprises a selected number of individual fan blades 32 illustrated rotating in the clockwise direction as noted by action arrow R in FIGS. 1 and 3. These blades 32 extend upwardly at a selected angle of attack designed to provide optimum performance.

As illustrated schematically in FIG. 3, the plurality of fan blades 32 are mounted to or carried by a structural ring or fan hub 34. A first bearings mechanism 35 serves to support the fan assembly 14 on the fuselage 12 in the vertical direction (see FIGS. 2 and 2a). The bearings mechanism 35 includes a series of opposed air cushion modules 36 radially arrayed around the body 12 and forming an annular tract for vertical support by engagement along the top and bottom of a portion of the fan hub 34 that forms an annular support race 38 of the fan assembly 14. Each module 36 is mounted to a first end of a beam 82 through a gimbel 46 that allows free floating action. Each beam 82 is pivotally mounted on a support bracket 84 that is fixed to the outer structural ring on hub 85 of the fuselage 12. A second opposite end of the beam 82 is connected to a hydraulic adjuster 86. The hydraulic adjuster 86 functions to set the height of the associated module 36 so that the desired gap is provided between the module 36 and the support race 38 to allow the bearings mechanism 35 to operate efficiently and effectively. This process is automated so that the bearing modules 36 are all properly set prior to fan operation. Each of the modules 36 includes a pressurized air inlet 40. During fan operation, a thin air gap 42 allows controlled escape of the pressurized air around the periphery of the module 36, thus providing an air cushion support between the module 36 and the adjacent support race 38.

A second bearings mechanism 37 (see FIGS. 2a, 4 and 5) serves to center the fan assembly 14 in the fuselage 12 (see also FIG. 3). In the illustrated embodiment the mechanism 37 comprises spaced idler rollers 50 connected to the fan hub 34 by rocker arms 52. More specifically and as best illustrated in FIG. 2a, each rocker arm 52 is pivotally connected to the inner wall of the fan hub 34 by means of a trunnion 51 so as to allow the rocker arm to freely pivot. A first end of the rocker arm 52 includes a yoke 53 for holding the associated idler roller 50 by means of a shaft 55 about which the roller freely rotates. A second end of the rocker arm 52 includes a counter weight 61 (not needed for alternative embodiment shown in FIG. 5). A preload spring 57 mounted between the fan hub 34 and the rocker arm 52 provides a force that biases the idler roller 50 toward the continuous race 59 extending around the support ring 85 of the fuselage 12.

The preload springs 57 function to provide a radial preload on the idler rollers 50 that works to maintain centering of the fan assembly 14 on the fuselage 12. The radial preload results in generating a tangential friction force on the fuselage 12 from the rollers 50. The preload is sized to balance the impulse from the engine gases passing from the orifices 30 in the fuselage 12 into the receptors 28 of the fan assembly 14. The impulse from the engine gases works in a direction opposite to the tangential friction force from rollers 50. More specifically, engine exhaust gases exit the fuselage 12 at an angle of approximately 60 degrees which results in an overall impulse of approximately 894 lbs. For a fifteen foot diameter fan assembly 14, preload force for each of seven idler rollers 50 will be approximately 1300 lbs. Such a preload creates an overall frictional force that counteracts the impulse force while maintaining the centering of the fan assembly 14 on the fuselage 12 up to an unbalance force of 0.73 ounces at approximately 880 RPM.

As illustrated in FIG. 3, the idler rollers 50 are equally angularly spaced 360° around the fan hub 34 to engage and roll along the continuous race 59. Seven idler rollers 50 are illustrated in FIG. 3 at spaced intervals of approximately 51.43°. While seven idler rollers 50 are illustrated, it should be appreciated that more or less could be provided (e.g. nine idler rollers spaced at 40° intervals and six idler rollers spaced at 60° intervals).

Figure 4:
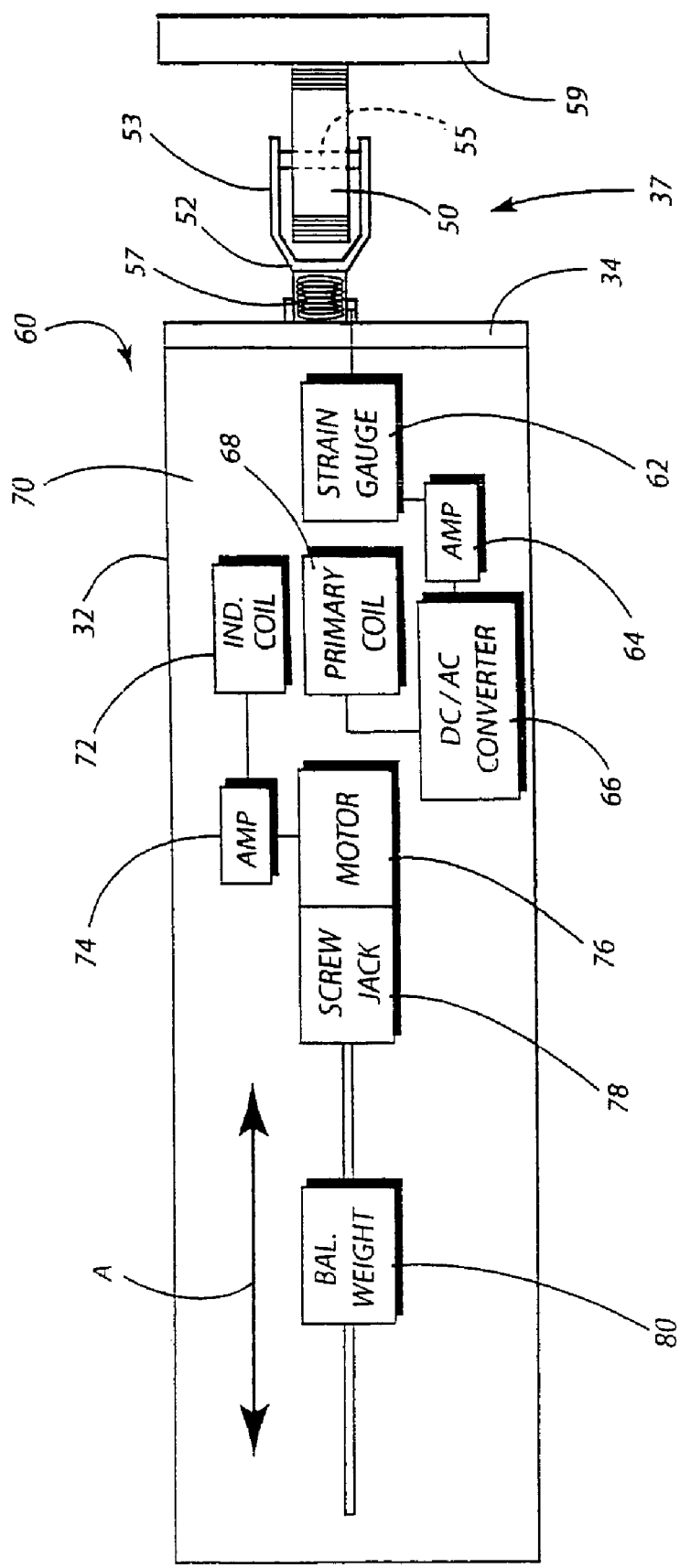
FIG. 4 is a schematical view illustrating the details of the active system as they relate to a single blade of the fan assembly.

An active system, generally designated by reference numeral 60 and best illustrated in FIGS. 3 and 4, is provided for sensing vibration and balancing the fan assembly 14 during its rotation relative to the fuselage 12. In the illustrated embodiment, the system 60 includes multiple strain gauges 62. One strain gauge 62 is mounted to a lever D which is sized to bend linearly within the operating range of the strain gauge. Each lever D is connected to each rocker arm 52 that supports the rollers 50. Thus, there are seven strain gauges 62 in all. Each strain gauge 62 is connected to additional components of the system 60 including an amplifier 64 that is connected to a DC/AC converter 66 that is in turn connected to a primary coil 68 that is associated with an induction coil 72, another amplifier 74, a motor 76, a screw jack 78 and a balancing weight 80. The various system components 64, 66, 68, 72, 74, 76, 78 and 80 associated with a strain gauge 62 may all be held in an internal cavity 70 in the fan blade 32 adjacent the rocker arm 52 and strain gauge 62. Where seven sensors or strain gauges 62 are provided, seven related component systems are mounted in the internal cavity 70 of the adjacent fan blades 32. Thus, if the fan assembly 14 includes a total of twenty-eight fan blades 32, every fourth blade is equipped with a displaceable balancing weight 80 and the related system components 62, 64, 66, 68, 72, 74, 76 and 78.

Figure 5:
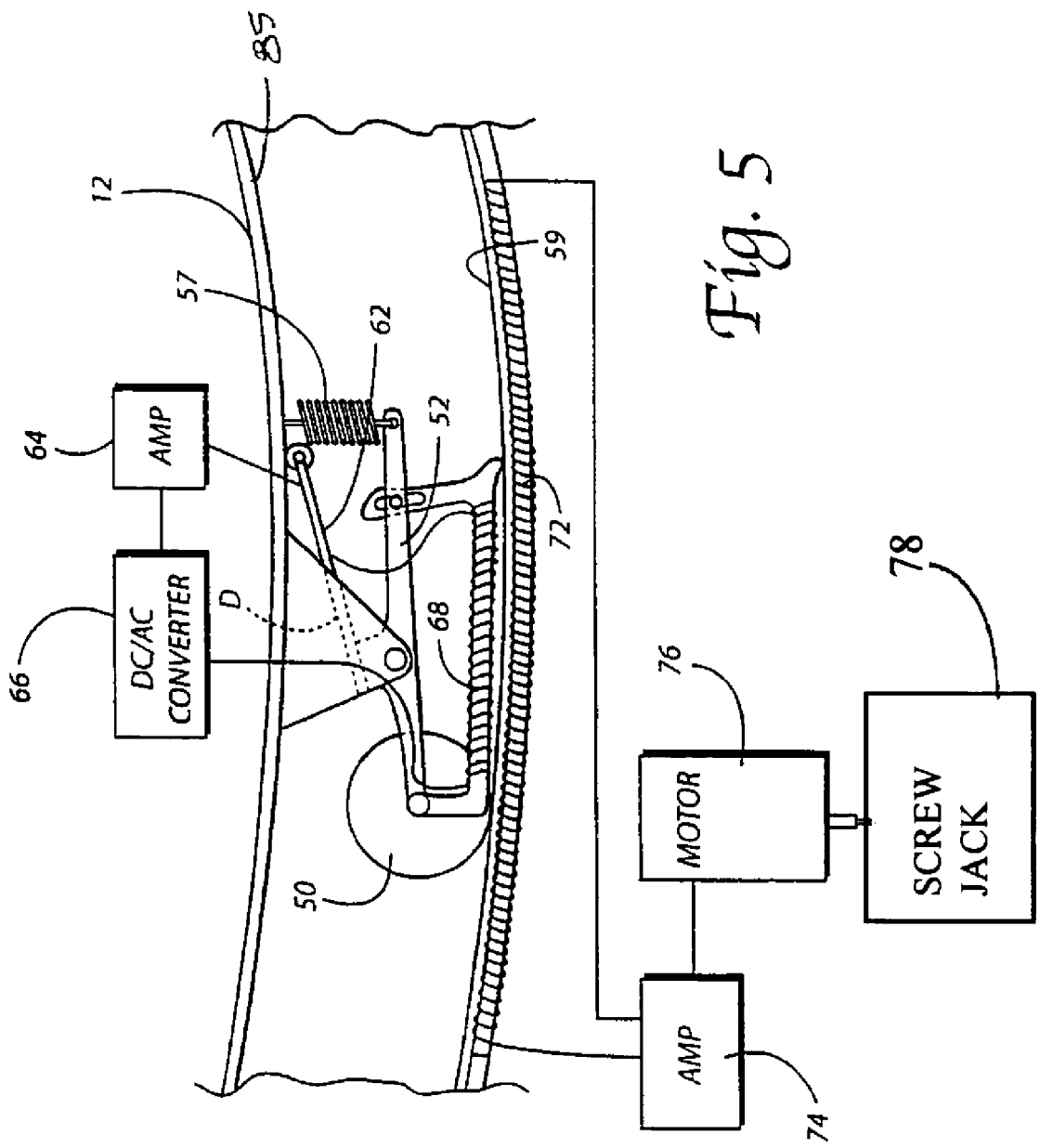
FIG. 5 is a view similar to FIG. 2a but showing an alternative embodiment wherein the idler roller is mounted on the fuselage.

In an alternative embodiment of the active balance system illustrated in FIG. 5, the rollers 50 and its support including the preload spring 57, the strain gauge 62, the amplifier 64, the DC/AC converter 66 and the primary coil 68 are mounted on the structural ring 85 of the fuselage 12. The secondary induction coil 72 is mounted on the fan 14, along with the amplifier 74, the screw jack 78 and the balance weight 80. The primary coil 68 is connected to the roller 50 to maintain a close spacing from the secondary coil 72.

Vibration, as sensed by a radial displacement of the fan assembly 14 exceeding preload force of the springs 57, produces a radial load on the idler rollers 50 riding on the smooth surface of the fuselage race 59. This load is continuously detected in real time by the strain gauges 62 that are mounted on lever D that restrains rotation of the rocker arms 52 holding the idler rollers 50. As a result, each strain gauge 62 produces an EMF or current signal proportional to the load sensed. That signal is amplified by the amplifier 64 associated with each strain gauge 62. Each amplified signal is then converted from direct current to alternating current by the associated converter 66 before being transmitted to the primary coil 68 associated with each roller 50. Thus, at any given moment, the system 60 produces seven signals for correcting the balance of the fan assembly 14, one signal at each primary coil 68. Vibration sensing in the alternative embodiment is similarly conducted.

The primary coils 68 transfer the signals to the adjacent induction coils 72. The seven signals are then sent to the amplifiers 74 for amplification before being sent to the associated motors 76 which drive the screw jacks 78 that in turn radially adjust the position of the balancing weights 80 provided in the fan blades 32. The balancing weights 80 are displaceable in either direction as illustrated by action arrow A within the cavities 70 of the seven fan blades 32 in order to restore balance to the fan assembly 14. For so long as vibration is detected, the strain gauges 62 will produce a proportional current that results in a correction signal. Thus, the motors 76 are driven continuously to move the balancing weights 80 in the various fan blades 32 until balance is achieved. At that time, vibration ceases, the strain gauges 62 fail to produce a current, the motors 78 stop and the balancing weights 80 remain stationary.

The application will dictate installation requirements. For example, for a fan assembly 14 with a diameter of about 15 feet, the balancing weights 80 may each weigh on the order of about 1.0 to about 4.0 lbs. The range of motion for each balancing weight 80 within each fan blade 32 is less than one foot. In contrast, for a fan assembly of about 84 feet the balancing weights 80 each weigh on the order of about 12.3 lbs and the range of motion is on the order of five feet. Further, while the components of the active system 60 just described are connected to each of the idler rollers 50 in FIG. 3, it should be appreciated that such a system may be provided on fewer than all the idler rollers 50 if desired (e.g. every other idler roller, every third idler roller).

Figure 6:
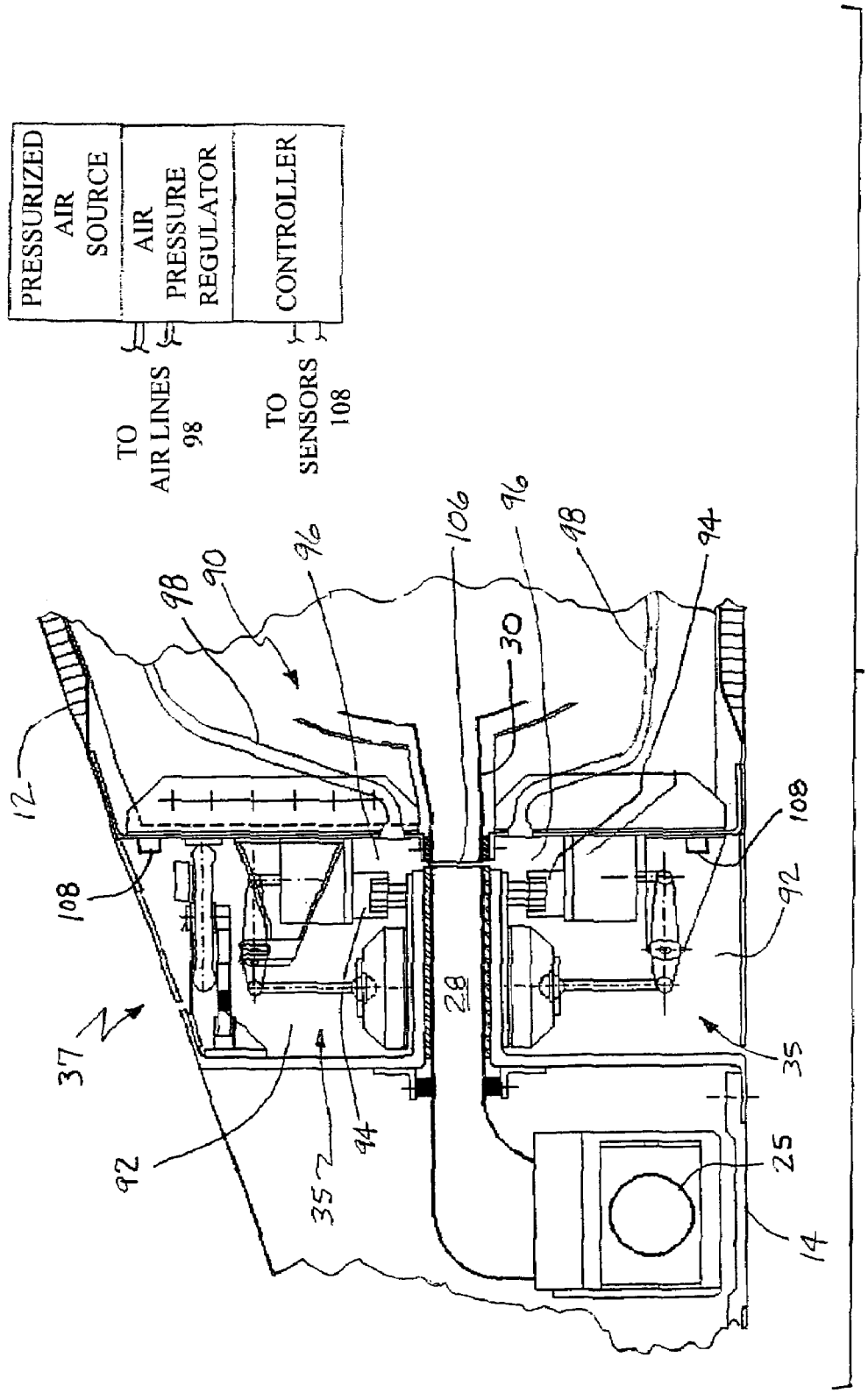
FIG. 6 is a partially schematical illustration of the brush seal assembly that thermally isolates the first and second bearing mechanisms from the hot exhaust gases moving through the interface between the feed duct and the nozzle array.

As best illustrated in FIG. 6, a brush seal assembly 90 thermally isolates the first bearing mechanism 35 and second bearing mechanism 37 in the work space 92 defined between the fuselage 12 and the fan assembly 14 from the hot exhaust gases passing through the feed duct 26 to the nozzles 25 arrayed annularly around the fan assembly 14. As illustrated, a brush seal 94 extends across the entry to the work space 92 both above and below the receptors 28. A brush seal manifold 96 is provided between the brush seals 94 and the interface 106 between the receptors 28 and the orifices 30. Pressurized air is provided to the brush seal manifold 96 through the supply lines 98 that are connected to a pressurized air source 100 (e.g. the high pressure compressor stage of at least one of the engines 20, 22, 24). A pressure sensor 108 is mounted in the space 92 to monitor pressure in that space. Alternatively, a pressure sensor 108 could be mounted in the intake receptor 28 or orifice 30 adjacent the interface 106 to monitor the hot exhaust gas pressure. Preferably multiple sensors 108 are mounted in such a position for redundancy. The pressure sensors 108 are connected to a controller 110 that is connected to a pressure regulator 112 that regulates the pressure of the air supplied by the pressurized air source 100 to the brush seal manifold 96 by the supply lines 98. As the pressurized air from the source 100 is regulated down in pressure to match the sensed pressure of the exhaust gases at the interface 106, it undergoes expansion and cooling. Typically, the pressurized air provided to the brush seal manifold 96 has a temperature of about 80° F.±20° F. Of course, an optional air cooler could be provided in the lines 98 if further cooling is desired.

The pressure ratio $P_2/P_1$ of engine gases at the interface 106 ($P_1$) and the hot gas nozzle pressure 25 ($P_2$) should be maintained above 0.524 in order to accelerate the hot gases to sonic velocity at the eyeball nozzle exit. As noted above the brush seal manifold pressure 96 should be maintained to substantially match the hot gas pressure at the interface 106 at all times of operation in order to maintain the desired air curtain between the brush seal 94 and the hot exhaust gases at the interface 106 between the intake receptors 28 and orifices 30. Stated another way, the pressurized air provided to the brush seal manifold 94 should have a pressure $P_2$ equal to or greater than the pressure $P_1$ of the hot exhaust gases at the interface 106 in order to maintain the integrity of the air curtain.

In summary, numerous benefits result from employing the concepts of the present invention. An HSVTOL aircraft 10 equipped with the active system 60 for sensing vibration and balancing the fan assembly 14 represents a significant advance in the art. By reducing and eliminating vibration with an active system 60, the stability of the aircraft 10 is enhanced. This is a particularly important feature for military aircraft 10 as the fan assembly 14 may become damaged in combat, lose balance and produce a vibration that might otherwise make the aircraft 10 difficult to control during hovering, landing and/or take off. Advantageously, by manipulating the radial position of the balancing weights 80 in and out along the various fan blades 32 equipped with the balancing system 60, in many instances it will now be possible to compensate for the out-of-balance condition.

The foregoing description of a preferred embodiment of the present invention has been presented for purposes of illustration and description. It is not intended to be exhaustive or to limit the invention to the precise form disclosed. Obvious modifications or variations are possible in light of the above teachings.

For example, as illustrated in the FIG. 5 embodiment, the idler rollers 50 may be mounted to or carried on the fuselage 12 if desired. In this embodiment, each rocker arm 52 is pivotally connected to the fuselage 12 by means of a trunnion 51 which allows the rocker arm to freely pivot. A preload spring 57 is mounted between each of the rocker arms 52 and the fuselage 12 to provide a force to bias the idler rollers 50 toward the continuous race 59 extending around the fan hub 34. Thus, the desired preload is again provided to maintain the centering of the fan assembly 14 on the fuselage. In this embodiment, the imbalance signal from the strain gauge 62 is amplified on the body 12 and transmitted to the fan assembly 14 by means of magnetic induction between the primary and induction coils 68, 72. The signal is then sent to the associated motor 76 to drive the screw jack 78 and adjust the position of the weight 80.

Further, while the horizontal bearing assembly 37 of the illustrated embodiment includes a plurality of idler rollers 50, it should be appreciated that other structures could be utilized for the same purpose. Such alternative structures include but are not necessarily limited to air bearings and/or foil bearings or a combination of these structures with roller bearings.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. The drawings and preferred embodiments do not and are not intended to limit the ordinary meaning of the claims and their fair and broad interpretation in any way.

What is claimed:

1. A high-speed vertical take-off and land aircraft, comprising:
   a body;
   an engine supported by said body;
   a fan assembly carried by said body, said fan assembly including a hub and a plurality of blades to provide vertical lift for said aircraft;
   a nozzle ring on said fan assembly providing an annular nozzle array for ejecting hot exhaust gases at a temperature from said engine;
   a feed duct receiving said hot exhaust gases from said engine and directing said hot exhaust gases to said annular nozzle array;
   an interface between said feed duct and said annular nozzle array where said hot exhaust gases have a pressure $P_1$;
   a bearing mechanism vertically supporting and horizontally centering said fan assembly, said bearing mechanism being carried in a work space defined between said fan assembly and said body; and
   a brush seal assembly thermally isolating said work space from said hot exhaust gases moving through said feed duct and said annular nozzle array;
   said brush seal assembly including:
   (a) a brush seal positioned across an entry to said work space;
   (b) a brush seal manifold provided between said brush seal and said interface; and
   (c) an air source providing pressurized air to said brush seal manifold at a pressure $P_2$ where $P_2$ is equal to or greater than $P_1$ so as to provide a curtain of relatively cool air between said brush seal and said hot exhaust gases whereby said work space is thermally isolated from said hot exhaust gases.

2. The aircraft of claim 1, wherein said brush seal assembly further includes a pressure sensor that senses hot exhaust gas pressure $P_1$ in at least one of said annular nozzle assembly, said feed duct and said interface.

3. The aircraft of claim 2, wherein said brush seal assembly further includes a controller responsive to said pressure sensor and connected to said air source to adjust the pressure $P_2$ of the pressurized air in said brush seal manifold in order to maintain a desired temperature in said work space.

4. The aircraft of claim 3, wherein said brush seal and said brush seal manifold are both annular in shape and extend around said body.

5. A brush seal assembly for thermally isolating a first space from hot gases in a second space having a pressure $P_1$, said assembly comprising:
   a brush seal positioned across an entry to said first space;
   a brush seal manifold provided between said brush seal and said second space; and
   an air source providing pressurized air to said brush seal manifold at a pressure $P_2$ where $P_2$ is equal to or greater than $P_1$ so as to provide a curtain of relatively cool air between said brush seal and said hot gases whereby said first space is thermally isolated from said hot gases.

6. The brush seal assembly of claim 5, wherein said brush seal manifold is open to said second space.

7. The brush seal assembly of claim 5, further including a pressure sensor that senses pressure in said second space.

8. The brush seal assembly of claim 7, further including a controller responsive to said pressure sensor and connected to said air source to adjust the pressure $P_2$ of said pressurized air in said brush seal manifold in order to maintain a desired temperature in said first space.

9. The brush seal assembly of claim 8, wherein said brush seal in annular in shape.

10. A method of thermally isolating a first space from hot gases in a second space, comprising:
   providing a brush seal between said first space and said second space;
   providing a brush seal manifold between said brush seal and said second space; and
   delivering pressurized air to said brush seal manifold at a pressure necessary to form an air curtain between said first space and said second space.

11. The method of claim 10, further including sensing pressure in said second space and adjusting the pressure of said pressurized air in said brush seal manifold in order to maintain said air curtain and a desired operating temperature in said first space.

12. The method of claim 11, including adjusting temperature of said pressurized air delivered to said brush seal manifold.

* * * * *